No. 668,910. Patented Feb. 26, 1901.
P. EBELING.
GLASS PRESS.
(Application filed July 9, 1900.)
(No Model.) 3 Sheets—Sheet 1.

Witnesses: Inventor:
F. M. Dapper. Phillip Ebeling
J. H. Bradley. by Darwin S. Wolcott
Atty.

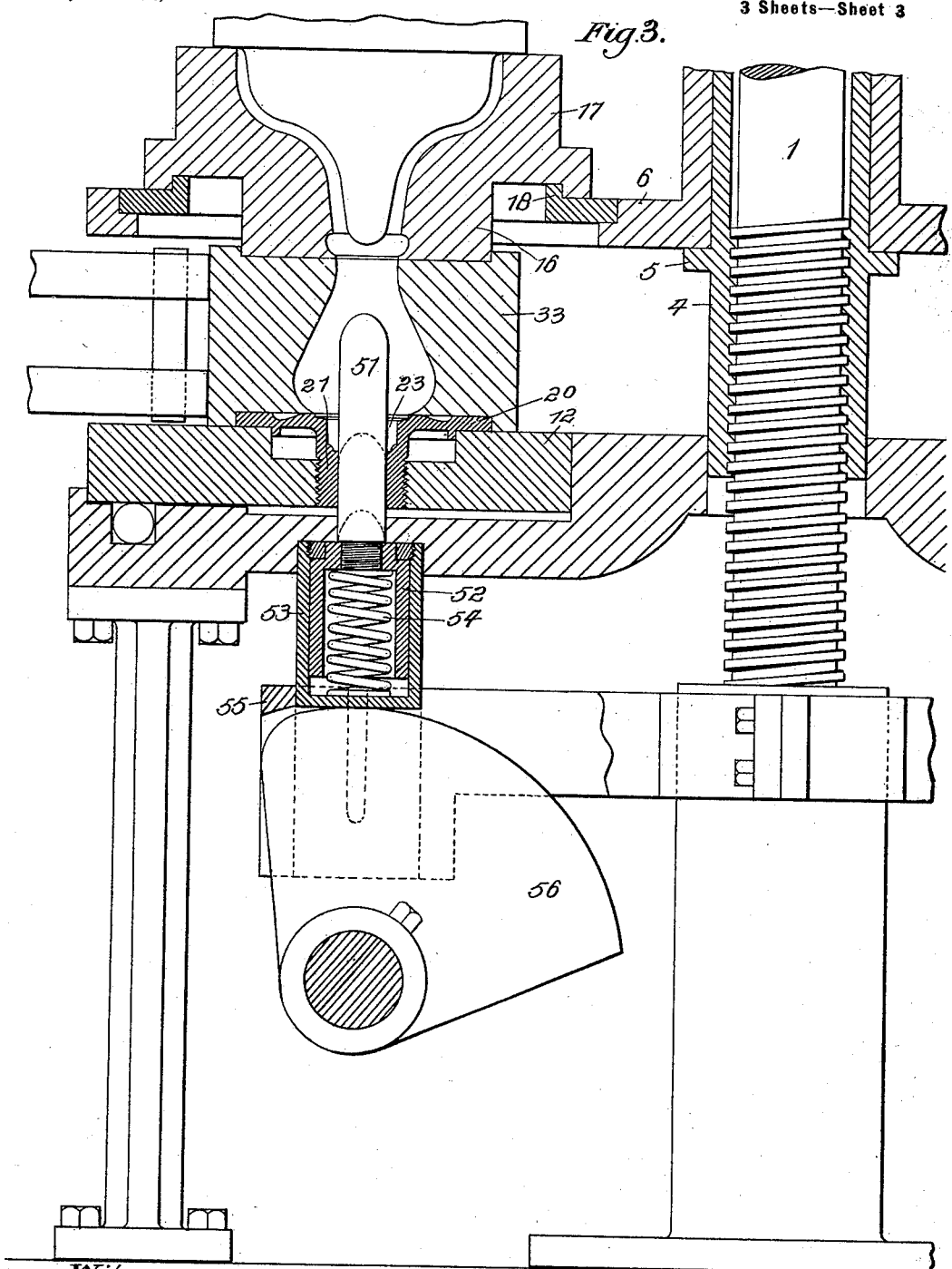

UNITED STATES PATENT OFFICE.

PHILLIP EBELING, OF FINDLAY, OHIO.

GLASS-PRESS.

SPECIFICATION forming part of Letters Patent No. 668,910, dated February 26, 1901.

Application filed July 9, 1900. Serial No. 22,942. (No model.)

*To all whom it may concern:*

Be it known that I, PHILLIP EBELING, a citizen of the United States, residing at Findlay, in the county of Hancock and State of Ohio, have invented or discovered certain new and useful Improvements in Glass-Presses, of which improvements the following is a specification.

The invention described herein relates to certain improvements in machines for shaping glass, such improvements being more especially applicable to that class or kind of machines forming the subject-matter of Letters Patent No. 653,412, dated July 10, 1900.

In the manufacture of articles of glassware in which a blank is first pressed and the article finally shaped by blowing it is found that in the construction of presses now in use, where the presser-ring and plunger are connected by a common rod to the cross-head, too much pressure may be given to the glass in forming the blank, thereby causing the the mold to open slightly at the meeting edges of its sections. By reason of this slight opening the glass adjacent to the meeting edges of the sections is cooled more rapidly than other parts, so that when subjected to the final shaping operation by blowing these cool parts of the blank will not stretch and yield equally with the hotter portions, so that the latter portions are unduly stretched and in the finished article are thinner than the other portions of the walls.

It is characteristic of some forms of presses that when the cross-head is moved down by the lever or other mechanism the rod connecting the shaping-plunger and the presser-ring is permitted to yield, a spring being interposed between such rod and the cross-head. As soon as the downward movement of the shaping-plunger is arrested all further compression of the springs between the presser-plate and the rod is also arrested. Hence in case too much glass has been cut off in the mold, so that the plunger cannot travel down to its full extent, sufficient tension will not be applied to the springs between the presser-plate and the rod to hold the presser-plate sufficiently tight on the mold to prevent any escape of glass between the mold and the ring.

The invention has for its object a construction and arrangement of plunger-operating mechanism whereby the glass in the mold may be subjected to a yielding shaping-pressure.

The invention is hereinafter more fully described and claimed.

Figure 1:
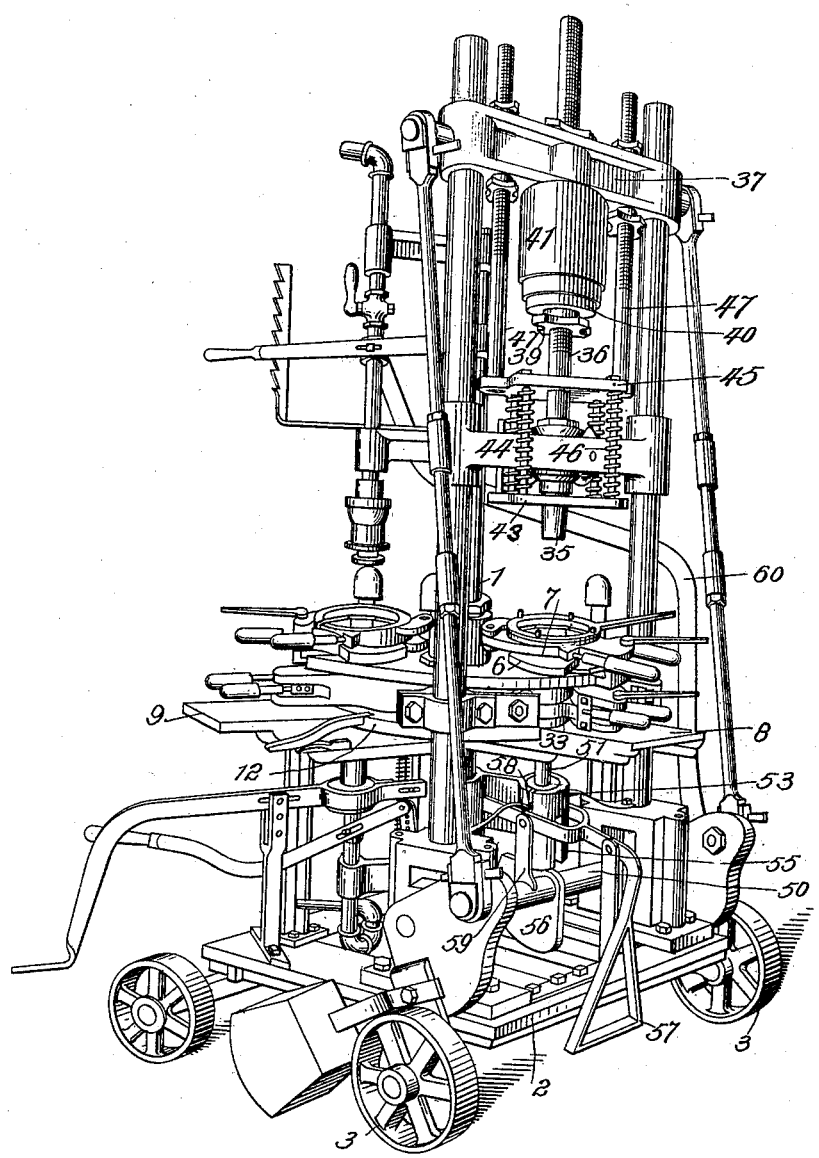
Figure 2:
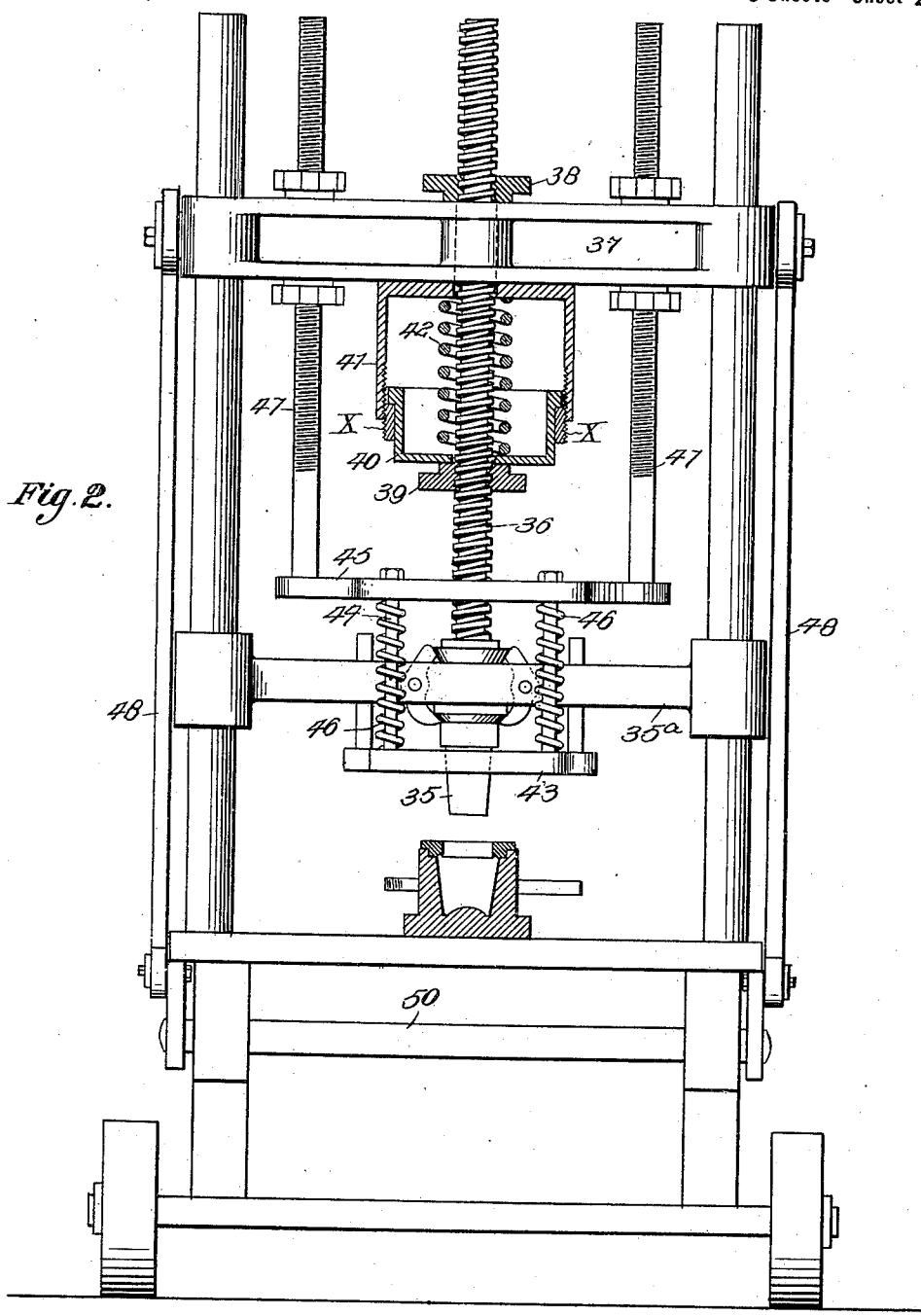

In the accompanying drawings, forming a part of this specification, Figure 1 is a perspective view of a glass-shaping machine having my improvements applied thereto. Fig. 2 is a view, partly in section and partly in elevation, of an ordinary press-mold having my improved mechanism for operating the upper or main shaping-plunger applied thereto; and Fig. 3 is a sectional elevation, on an enlarged scale, showing the application of my improvement to the operation of a lower shaping-plunger in connection with a mold for forming lamps.

While the improvements hereinafter claimed are readily applicable to many styles or kinds of machines, I have preferred to show them in connection with the machine forming the subject-matter of the patent above referred to. In said machine a supporting post or pillar 1 is secured on a bed-plate 2, which is preferably provided with wheels 3 to facilitate the moving of the machine from place to place. A portion of the post or pillar is threaded for the reception of the internally-threaded sleeve 4, which is provided with a flange 5 for supporting the rotatable table 6. To the center post is secured radially-projecting brackets 8 9, &c., which serve to support the annular table 12, which is preferably mounted on friction-rollers, as shown in Fig. 3. The table 6 is adapted to be adjusted vertically to and from the annular table 12 by any suitable means— such, for example, as that shown in the patent referred to—to accommodate the molds for articles of different heights. The table 6 is provided with a series of openings through which a boss or projection 16 on the mold 17 projects. These openings are made sufficiently larger than the boss or projection 16 to permit the mold, which is of the usual sectional form, to be opened wide enough for the removal of the completed article through the radial slots extending from the openings through the periphery of the table. In order to center the press-mold above the openings, the table 6 is provided with annular centering-ribs 18 around the openings, as shown in Fig. 3, and the under side of the mold 17 is recessed, so as to fit around said ribs when the mold is closed. The lower or annular table 12 is also provided with means for centering the blank and blow molds, such centering means being formed by disks 20, secured to the table in any suitable manner—as, for example, in the construction shown in Fig. 3, the disks are formed with threaded stems 21, screwing into threaded openings in the table. As these disks form the bottoms of the press and blow molds, it is evident that their construction will vary in accordance with the article to be formed—as, for example, in making lamps the disks are formed with central passages, the purpose of which will be hereinafter stated, and with recesses in their upper side, around said passages, for the formation of the neck of the lamp or other article.

The molds 33 are formed with recesses in their upper and lower ends, so as to inclose the lower ends of the projections 16 on the press-molds and the disks 20 on the table 12, thereby holding all parts in true alinement during the pressing and blowing operations.

The pressing mechanism consists of a shaping-plunger 35, detachably connected to guide-head 35ª, which in turn is detachably secured in the usual or any suitable manner to the threaded rod 36. This rod passes loosely through the cross-head 37 and is provided with a lifting-nut 38, which rests on the cross-head. An adjusting-nut 39 is arranged on the rod below the cross-head and serves as a support for the pressing-head 40, surrounding the rod. This head is guided in its movements by a shell 41, which rests against the cross-head 37. Pressing or shaping movement is imparted to the rod and plunger carried thereby by a spring 42, interposed between the pressing-head 40 and the cross-head, as shown in Fig. 2.

The spring presser-plate 43 is attached to the lower ends of rods 44, which are movably connected to the plate 45, so as to move freely through said plate when springs 46, interposed between the presser-plate and plate 45, are compressed. The plate 45 is adjustably secured to the cross-head 37 by rods 47. The cross-head 37 is connected by pitmen 48 to arms 49 on the power-shaft 50, which can be rotated by any suitable means to lower and raise the cross-head.

It will be observed that by raising and lowering the pressing-head 40, and thereby changing the tension of the spring 42, any desired yielding pressure can be applied to the glass contained in the shaping-mold.

When forming articles such as blanks for lamps, &c., requiring the coöperation of an upper plunger and a lower plunger, as 51, the latter is preferably secured to a head 52, which is arranged within a guide-shell 53. Between the head and the bottom of the guide-shell a spring 54 is interposed, so that the pin or plunger 51 will be yieldingly held in operative position.

The guide-shell 53 can be raised and lowered to move the pin into and out of operative position by any suitable means—as, for example, in the construction shown the guide-shell is arranged within a sleeve 55, formed on a bracket secured to any suitable part of the machine. This sleeve is slotted to permit of the entrance into it of the cam 56 on the power-shaft 50. As the latter is rotated the cam bears against the bottom of the guide-shell, raising the latter and forcing the pin or plunger to operative position in the mold.

The guide-shell and pin are raised sufficiently to at least close the opening in the disk 20 by means of an angular treadle 57, the inner end of which strikes against lugs 58 on the shell 53. The block and pin are supported in this initial position by a dog 59, so pivotally connected to the inner end of the treadle that when the latter is shifted to raise the shell and pin the lower end of the dog will swing in and rest on the shaft 50.

After the pin 51 has been raised to initial position by the treadle glass is dropped into the press-mold and the lever 60 on shaft 50 is shifted to force down the shaping-plunger 35. By the rotation of the shaft 50 the cam 56 is moved under the shell 53, thereby completely raising the pin 51 into the blank-mold or supporting the pin in the position to which it had been previously raised by the treadle 45. After the cam has passed under the block the dog 59 is pushed off the shaft by a projection thereon, so that when the cam moves back from under the shell the latter will fall, withdrawing the pin from the mold and disk 20.

As is well known by those skilled in the art, the greater the pressure to which glass is subjected the stiffer and more rigid it becomes, rendering it difficult to effect expansion by subsequent blowing. By so constructing the pressing mechanism that the glass is subjected only to a yielding pressure, as is characteristic of my improved machine, the glass is in better—i. e., in a softer—condition for subsequent blowing.

The use of a spring so interposed between the lower pin or plunger and its operating mechanism as not only to cause the pin to act yieldingly on the glass, but also to withdraw the pin, effects a loosening of the pin from the surrounding glass and a gradual withdrawal thereof, thereby avoiding a sucking down of the glass.

The operation of the machine is similar to that described in the patent heretofore referred to.

It is characteristic of my improvement where the plunger and presser-plate are yieldingly connected to the cross-head independently of each other that any checking of the downward movement of the plunger by reason of too much glass in the mold will not have any effect on the presser-plate, but the latter will be held more tightly against the mold as the cross-head continues its movement after the movement of the plunger is arrested.

It will be understood by those skilled in the art that the constructions shown in Figs. 2 and 3 may be used together in the same machine, as shown in Fig. 1, or may be used independently of each other, if desired, and that the plunger-operating mechanism may be employed where the article is formed entirely by pressing.

I claim herein as my invention—

1. In a glass-press, the combination of a cross-head, a plunger, yielding connections from the plunger to the cross-head, a presser plate or ring, yielding connections from the cross-head to the presser-plate independent of the plunger connections, and means for adjusting or changing the positions of the plunger and presser-plate relative to each other and to the cross-head, substantially as set forth.

2. In a glass-press, the combination of a cross-head, a plunger, a spring interposed between the cross-head and the plunger, means for adjusting the tension of the spring, and a presser plate or ring, and connections from the presser-plate to the cross-head independent of the plunger connections, and means for adjusting said connections, substantially as set forth.

3. In a glass-press, the combination of a mold, a main shaping-plunger, a lower plunger or pin, means for reciprocating the latter, and a spring interposed between the pin or plunger and its operating mechanism, substantially as set forth.

In testimony whereof I have hereunto set my hand.

PHILLIP EBELING.

Witnesses:
F. E. GAITHER,
DARWIN S. WOLCOTT.